(12) United States Patent
Choi et al.

(10) Patent No.: US 9,030,758 B2
(45) Date of Patent: May 12, 2015

(54) PHOTOGRAPHIC LENS SYSTEM ENABLING REDUCTION IN TIGHTNESS OF MANUFACTURING TOLERANCE

(71) Applicant: Sekonix Co., Ltd., Dongducheon, Gyeonggi-Do (KR)

(72) Inventors: Soon Chul Choi, Gyeonggi-Do (KR); Ki Youn Noh, Gyeonggi-Do (KR)

(73) Assignee: Sekonix Co., Ltd., Dongducheon-Si (KR)

( * ) Notice: Subject to any disclaimer, the term of this patent is extended or adjusted under 35 U.S.C. 154(b) by 11 days.

(21) Appl. No.: 14/134,772

(22) Filed: Dec. 19, 2013

(65) Prior Publication Data

US 2015/0085380 A1    Mar. 26, 2015

(30) Foreign Application Priority Data

Sep. 24, 2013    (KR) ........................ 10-2013-0113170

(51) Int. Cl.
*G02B 3/02* (2006.01)
*G02B 9/60* (2006.01)
*G02B 3/04* (2006.01)

(52) U.S. Cl.
CPC ... *G02B 9/60* (2013.01); *G02B 3/04* (2013.01)

(58) Field of Classification Search
USPC ......................................... 359/719
See application file for complete search history.

(56) References Cited

U.S. PATENT DOCUMENTS

2015/0029383 A1\*    1/2015    Tsai et al. .................... 348/335

\* cited by examiner

*Primary Examiner* — James Jones
(74) *Attorney, Agent, or Firm* — Locke Lord LLP; Christopher J. Capelli; Daniel J. Fiorello

(57) ABSTRACT

A photographic lens system enabling reduction in tightness of manufacturing tolerance of lenses, which has five lenses: a first lens, a second lens, a third lens, a fourth lens and a fifth lens sequentially arranged along an optical axis from an object, wherein the first lens has strong positive refractivity, the second lens is a meniscus type lens and has weak positive refractivity, the third lens has upward convex-shaped positive refractivity, the fourth lens has upward convex-shaped negative refractivity, and the fifth lens has negative refractivity, wherein the lens system satisfies a relation, f2/f1>10, wherein f1 is a focal distance of the first lens, and f2 is a focal distance of the second lens.

16 Claims, 2 Drawing Sheets

PHOTOGRAPHIC LENS SYSTEM ENABLING REDUCTION IN TIGHTNESS OF MANUFACTURING TOLERANCE

CROSS REFERENCE TO RELATED APPLICATION(S)

This application claims the benefit of Korean Patent Application No. 10-2013-0113170, filed on Sep. 24, 2013, entitled "Photographic lens system enabling reduction in tightness of manufacturing tolerance", which is hereby incorporated by reference in its entirety into this application.

BACKGROUND OF THE INVENTION

1. Technical Field

The present invention relates to a photographic lens system made by assembling five lenses and, more particularly, to a photographic lens system enabling reduction in tightness of manufacturing tolerance, which is composed of five lenses, and in which refractivities, shapes, ABBE numbers, etc. of respective lenses are appropriately designed, thereby realizing lightness and smallness of the lenses, and enabling reduction in tightness of manufacturing tolerance of the lenses, and realizing high reproducibility of performance of the lenses.

2. Description of the Related Art

In recent years, the use of mobile phone cameras and digital cameras is increased and services provided by the mobile phone cameras and digital cameras are required to be diversified, for example functions such as photographing, picture transmission or communication are strongly required.

Particularly, photographic lens units of mobile phone cameras are required to provide improved and diverse functions. To this end, a new concept mobile phone, which is formed by combining a digital camera technique with a mobile phone technique and is a so-called "camera phone" (or camera mobile phone), has been proposed and spotlighted. To realize the requirements of high efficiency of the camera phone, a camera module in which an image pickup device having at least 3-megapixel size has been actively studied recently.

To realize the requirements of high definition and high efficient function higher than at least a 3-megapixel size, at least three to five lenses are used in the camera module of the mobile phone camera.

Examples of conventional techniques proposed to realize the requirements of high definition and high efficiency are referred to the following patent documents.

U.S. Pat. No. 8,395,851 discloses an optical lens system having five lenses sequentially arranged from an object side, in which a second lens has negative refractivity, and which is configured to form a predetermined focal distance, a predetermined radius of curvature, a predetermined ABBE number, etc.

Korean Patent No. 10-1158419 discloses a lens system composed of five lenses, in which a second lens has negative refractivity, and the five lenses are configured to realize respective predetermined conditions in the focal distance, the radius of curvature, etc.

Further, Korean Patent No. 10-12765434 discloses a photographic optical lens system, which is composed of five lenses, and in which a second lens has negative refractivity.

In the related art photographic lens systems each composed of five lenses, it is typical that the second lens has the negative refractivity, as described above. When the second lens has the negative refractivity, the central portion of the lens is thinner than the peripheral portion, so the flowability of resin during an injection molding process of manufacturing lenses is reduced, and this reduces the reproducibility of performance of products.

In other words, the above-mentioned conventional techniques are problematic in that, during a process of manufacturing lenses, resin does not easily flow, so reproducibility of performance of lenses is reduced, and this makes the manufacturing tolerance of the lenses tight. Particularly, when a micro-lens system is a tight tolerance system, the performance varies product by product, so it is required to reduce the tightness of manufacturing tolerance of lenses and to increase the reproducibility of performance of the lenses by an easy method.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a photographic lens system enabling reduction in tightness of manufacturing tolerance, which is composed of five lenses, and in which the refractivities, shapes, ABBE numbers, etc. of respective lenses are appropriately designed, thereby realizing lightness and smallness of the lenses, and enabling reduction in tightness of manufacturing tolerance of the lenses, and realizing high reproducibility of performance of the lenses.

In one aspect of the present invention, there is provided a photographic lens system enabling reduction in tightness of manufacturing tolerance, including: a first lens, a second lens, a third lens, a fourth lens and a fifth lens sequentially arranged along an optical axis from an object, wherein the first lens has strong positive refractivity, the second lens is a meniscus type lens and has weak positive refractivity, the third lens has upward convex-shaped positive refractivity, the fourth lens has upward convex-shaped negative refractivity, and the fifth lens has negative refractivity; and the lens system satisfies a relation, $f2/f1>10$, wherein f1 is a focal distance of the first lens, and f2 is a focal distance of the second lens.

The photographic lens system may be designed to satisfy a relation, $|v2-v4|<5$, wherein v2 is an ABBE number of the second lens, and v4 is an ABBE number of the fourth lens, and to satisfy a relation, $te/tc<1.35$, wherein te is a lens thickness on an effective diameter of a rear surface of the second lens, and tc is a center thickness of the second lens.

The photographic lens system may further include: an iris arranged between the first lens and the second lens.

Further, the photographic lens system may be designed to satisfy a relation, $R\_L1S1/R\_L1S2<0.6$, wherein $R\_L1S1$ is a radius of curvature of a front surface of the first lens, and $R\_L1S2$ is a radius of curvature of a rear surface of the first lens, and to satisfy a relation, $|R\_L2S1-R\_L2S2|<0.15$, wherein $R\_L2S1$ is a radius of curvature of a front surface of the second lens, and $R\_L2S2$ is a radius of curvature of a rear surface of the second lens.

Further, the photographic lens system may be designed to satisfy a relation, $f2345/f>4$, wherein f is a total focal distance of all the lenses, and f2345 is a sum of focal distances of the second lens, the third lens, the fourth lens and the fifth lens.

Further, the photographic lens system may be designed such that the first lens has an aspheric surface on at least one surface, the second lens has aspheric surfaces on opposite surfaces, the third lens has an aspheric surface on at least one surface, the fourth lens has aspheric surfaces on opposite surfaces, and the fifth lens has aspheric surfaces on opposite surfaces, with a plurality of inflection points defined on the aspheric surfaces of the fifth lens. In the photographic lens system, a material of any one of the first lens, the second lens, the third lens, the fourth lens and the fifth lens is different from a material of remaining lenses.

As described above, the present invention provides a photographic lens system composed of five lenses, which is used in a mobile phone camera, a digital camera and a PC camera, realizes smallness of the camera, and provides high resolution images.

Particularly, in the present invention, a second lens having positive refractivity is designed such that the focal distance of the second lens is ten or more times the focal distance of a first lens, thereby realizing smallness and easy compensation for aberration of the lenses, and enabling reduction in tightness of manufacturing tolerance of the lenses, and increasing possibility of reproducing the performance of the lenses.

DESCRIPTION OF THE PREFERRED EMBODIMENTS

Figure 1:
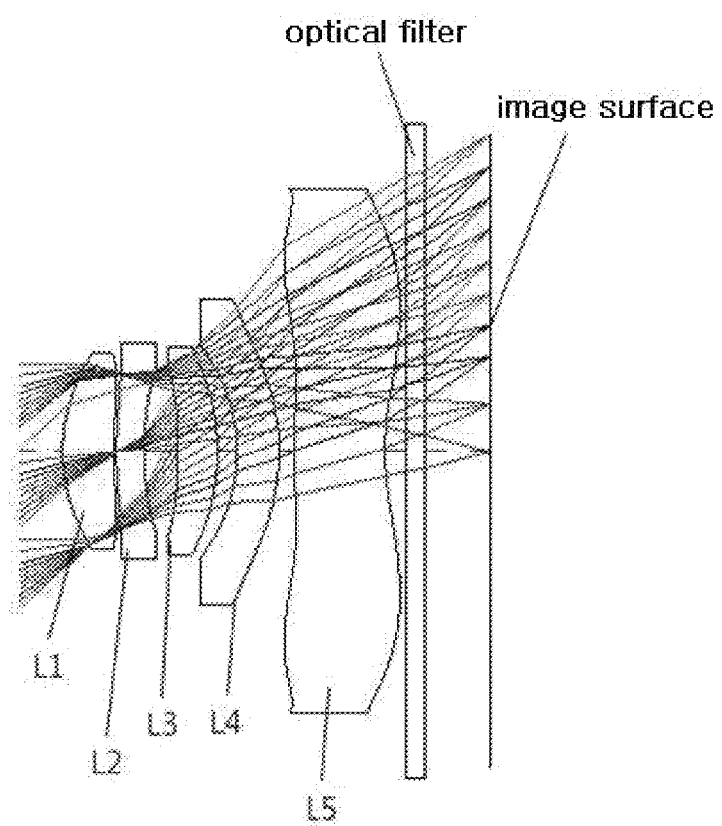
FIG. 1 is a view illustrating a photographic lens system enabling reduction in tightness of manufacturing tolerance according to a first embodiment of the present invention.

The present invention relates to a photographic lens system composed of five lenses, in which a first lens, a second lens, a third lens, a fourth lens and a fifth lens are sequentially arranged along an optical axis from an object.

Particularly, the second lens having positive refractivity is designed such that the focal distance of the second lens is ten or more times the focal distance of the first lens, thereby realizing smallness and easy compensation for aberration of the lenses, and enabling reduction in tightness of manufacturing tolerance of the lenses, and increasing possibility of reproducing the performance of the lenses.

Hereinafter, preferred embodiments of the present invention will be described in detail with reference to the accompanying drawings.

The present invention relates to a photographic lens system enabling reduction in tightness of manufacturing tolerance, in which a first lens, a second lens, a third lens, a fourth lens and a fifth lens are sequentially arranged along an optical axis.

Particularly, in the lens system, the first lens has strong positive refractivity, the second lens is a meniscus type lens and has weak positive refractivity, the third lens has upward convex-shaped positive refractivity, the fourth lens has upward convex-shaped negative refractivity, and the fifth lens has negative refractivity, wherein the lens system satisfies a relation, $f2/f1>10$, wherein f1 is a focal distance of the first lens, and f2 is a focal distance of the second lens.

Here, the relation, $f2/f1>10$, is defined such that the focal distance of the second lens is always ten or more times the focal distance of the first lens. When the focal distance of the second lens is less than the above-defined value, it is difficult to realize compensation for aberration or to realize smallness of the lens system. Further, when the second lens has a shorter focal distance, the manufacturing tolerance of the lens becomes tighter.

Accordingly, to reduce the tightness of manufacturing tolerance of lenses constituting the photographic lens system according to the present invention, the second lens is designed to have a positive refractivity value and have a focal distance that is ten or more times the focal distance of the first lens. Here, the second lens has relatively weak positive refractivity.

Further, the photographic lens system according to the present invention is designed to satisfy a relation, $|v2-v4|<5$. In other words, the ABBE number of the second lens is designed such that the difference of the ABBE number between the second lens and the fourth lens does not exceed 5. This relation is provided to realize smallness of the lens system while removing chromatic aberration and realizing high resolution. To this end, the second lens and the fourth lens are designed such that the ABBE number difference between them does not exceed 5, and the second and fourth lenses can be made of materials having relatively small ABBE numbers (large dispersion values).

Further, the photographic lens system according to the present invention is designed to satisfy a relation, $te/tc<1.35$, wherein te is a lens thickness on an effective diameter of a rear surface of the second lens, and tc is a center thickness of the second lens.

The above-mentioned relation is provided to define the shape of the second lens. That is, the second lens is designed such that the difference of thickness between a central portion and a peripheral portion thereof is small, so resin can easily flow in a mold during an injection molding process of manufacturing the lens, thereby enabling reduction in tightness of manufacturing tolerance and increasing possibility of reproducing the performance of lenses.

Further, in the photographic lens system enabling reduction in tightness of manufacturing tolerance according to the present invention, an iris is arranged at a location between the first lens and the second lens, so the tightness of manufacturing tolerance of lenses and the angle of a main beam of light can be reduced, thereby reducing the total length of the lens system.

Further, the photographic lens system according to the present invention is designed to satisfy a relation, $R\_L1S1/R\_L1S2<0.6$, wherein R_L1S1 is a radius of curvature of a front surface (a surface directed toward the object) of the first lens, and R_L1S2 is a radius of curvature of a rear surface (a surface directed toward an image) of the first lens.

The above-mentioned relation is provided to define the shape of the first lens. In other words, the first lens is designed such that the radius of curvature of the rear surface of the first lens is larger than that of the front surface, so the rear surface of the first lens forms a flat surface, thereby realizing smallness of the lens system and enabling reduction in tightness of manufacturing tolerance.

Further, the photographic lens system according to the present invention is designed to satisfy a relation, $|R\_L2S1-R\_L2S2|<0.15$, wherein R_L2S1 is a radius of curvature of a front surface (a surface directed toward the object) of the second lens, and R_L2S2 is a radius of curvature of a rear surface (a surface directed toward the image) of the second lens.

The above-mentioned relation is provided to define the shape of the second lens. In other words, the second lens is designed such that the difference of the radius of curvature between the front and rear surfaces of the second lens does not exceed 0.15, so the shapes of the front and rear surfaces of the lens are nearly symmetrical. Further, the second lens is designed to have weak positive refractivity, so it forms a meniscus type lens.

This further increases the flowability of resin during the injection molding process of manufacturing the second lens, thereby enabling reduction in tightness of manufacturing tolerance of lenses and increasing the reproducibility of performance of the lenses.

Further, the photographic lens system according to the present invention is designed to satisfy a relation, f2345/f>4, wherein f2345 is a sum of the focal distances of the second lens, the third lens, the fourth lens and the fifth lens, and f is a total focal distance of the lens system. Here, the lens system of this invention is designed such that the sum of the focal distances of the remaining lenses with the exception of the focal distance of the first lens is four or more times the total focal distance. The above-defined difference between the sum of the focal distances and the total focal distance is set to realize compensation for aberration and smallness of lenses.

Further, in the photographic lens system according to the present invention, at least one surface of the first lens is an aspheric surface, opposite surfaces of the second lens are aspheric surfaces, at least one surface of the third lens is an aspheric surface, opposite surfaces of the fourth lens are aspheric surfaces, and opposite surfaces of the fifth lens are aspheric surfaces having a plurality of inflection points. Here, it is preferred that any one of the first lens, the second lens, the third lens, the fourth lens and the fifth lens be made of a material different from a material of the remaining lenses.

In other words, to compensate for spherical aberration, it is preferred that at least one surface of each of the respective lenses be shaped as an aspheric surface, and that the respective lenses be made of materials prepared by appropriately mixing glass or plastic materials. Further, it is preferred that the materials of the lenses be selected from materials having high refractivities which can efficiently reduce the length of the lens system and materials having different ABBE numbers which can efficiently compensate for chromatic aberration.

The above-mentioned shapes and materials of the first lens, second lens, third lens, fourth lens and fifth lens are defined to optimize the performance of the optical system by minimizing the spherical aberration, coma aberration, curvature of image field, distortion aberration and chromatic aberration, and to reduce the size of the optical system.

Further, the photographic lens system according to the present invention has positive refractivity, in which the first lens has strong positive refractivity, the second lens has weak positive refractivity, the third lens has positive refractivity, and the fourth and fifth lenses have negative refractivities.

Particularly, to compensate for the chromatic aberration, the first lens is designed to have strong positive refractivity, the second lens is designed to have weak positive refractivity, the third lens is designed to have positive refractivity, and the fourth and fifth lenses are designed to have relatively weak negative refractivities, so the lens system can compensate for distortion, thereby improving the color qualities of the central and peripheral portions of the image, and realizing a high resolution of the lens system. In other words, while the first lens is designed to have strong positive refractivity, the second to fifth lenses are designed to function as aberration compensating lenses in the lens system.

Further, the fifth lens is designed to form a bi-aspheric lens that has weak negative refractivity and a plurality of inflection points. Described in detail, the fifth lens is designed such that one surface thereof directed toward the object is convex toward the object at the central portion thereof, and gradually becomes concave toward the peripheral portion. Further, the other surface of the fifth lens directed toward the image is designed such that it has at least one inflection point, so it becomes concave toward the object at the central portion, and becomes gradually convex as it goes toward the peripheral portion.

Due to the above-mentioned fifth lens, the lens system can reduce the angle of the main beam of light, and can efficiently compensate for a variety of aberrations and distortion.

Hereinbelow, preferred embodiments of the present invention will be described.

First Embodiment

FIG. 1 is a view illustrating a photographic lens system enabling reduction in tightness of manufacturing tolerance according to the first embodiment of the present invention.

As shown in FIG. 1, in the first embodiment, a first lens L1, an iris, a second lens L2, a third lens L3, a fourth lens L4, and a fifth lens L5 are sequentially arranged along an optical axis from an object.

Table 1 shows numerical data of the lenses constituting the optical system according to the first embodiment of the present invention.

TABLE 1

| Surface (surface number) | RDY (radius of curvature) | THI (thickness) | Nd (refractivity) | Vd (ABBE number) |
|---|---|---|---|---|
| OBJ | | | | |
| 1 | 1.365497 | 0.554900 | 1.5441 | 56 |
| 2 | 2.761461 | | | |
| STO | | 0.031000 | | |
| 3 | 2.261320 | 0.300000 | 1.6378 | 23 |
| 4 | 2.306204 | 0.370100 | | |
| 5 | −4.199320 | 0.426000 | 1.5441 | 56 |
| 6 | −1.869531 | 0.221200 | | |
| 7 | −1.103352 | 0.450000 | 1.6378 | 23 |
| 8 | −1.727925 | 0.159000 | | |
| 9 | 2.669348 | 0.994100 | 1.53113 | 56 |
| 10 | 1.977544 | 0.230000 | | |
| | | 0.210000 | BK7 | |
| | | 0.700000 | | |
| IMG | | | | |

(OBJ: object surface, STO: iris, IMG: image surface, Infinity: planar surface)

As shown in FIG. 1, the first lens L1, the iris (STO), the second lens L2, the third lens L3, the fourth lens L4 and the fifth lens are sequentially arranged from the object, and, when the direction of the optical axis is set to an X-axis, and the direction crossing perpendicularly the optical axis is set to an Y-axis, the aspheric surface can be expressed by following Equation 1.

$$X(Y) = \frac{Y^2}{R} \frac{1}{1 + \sqrt{1-(1+K)\left(\frac{Y}{R}\right)^2}} + AY^4 + BY^6 + CY^8 + DY^{10} + EY^{12} + FY^{14}$$ [Equation 1]

Here, the aspheric surface is a curved surface formed by rotating a curved line obtained from the aspheric surface equation that is Equation 1 around the optical axis. In Equation 1, R is a radius of curvature, K is a conic constant, and A, B, C, D, E and F are aspheric surface coefficients.

The aspheric surface coefficients in Equation 1 which have data of the respective lenses are shown in Table 2.

TABLE 2

| K | A | B | C | D | E | F |
|---|---|---|---|---|---|---|
| −0.243919 | 0.0072206 | 0.0250063 | 0.009416 | −0.225287 | 0.4268641 | −0.291445 |
| | −0.564585 | 0.9662816 | −0.969021 | 0.4030845 | 0.0007885 | −0.109217 |
| | −0.544575 | 0.8620149 | −0.607472 | 0.1111193 | −0.006381 | 0.0115808 |
| 6.3583801 | −0.127004 | 0.1053957 | −0.059593 | 0.2177662 | −0.379787 | −0.010784 |
| | −0.121081 | −0.058808 | 0.1369094 | −0.192002 | 0.1791782 | 0.1079798 |
| | 0.0100794 | −0.188218 | 0.2986142 | −0.321801 | 0.1240943 | 0.1001948 |
| −4.792029 | −0.10179 | −0.090881 | 0.15547 | −0.14969 | 0.0268112 | 0.02641 |
| 0.250886 | −0.025305 | 0.0720584 | −0.028649 | 0.0189653 | −0.005173 | 0.0001344 |
| −32.36972 | −0.221651 | 0.0959605 | −0.020059 | 0.0018874 | −1.14E−05 | −3.59E−05 |
| −7.171408 | −0.169254 | 0.0031948 | −0.005095 | 0.0009579 | −0.000108 | 1.07E−05 |

Table 3 shows focal distances, total focal distance, and values of f2/f1, SL/TTL, f2345/f and v2−v4 of the respective lenses.

TABLE 3

| | | Focal distance | Total focal distance (f) | f2/f1 | SL/TTL |
|---|---|---|---|---|---|
| 1st lens | f1 | 4.34 | 3.85 | 11.52 | 1.05 |
| 2nd lens | f2 | 50.00 | | | |
| 3rd lens | f3 | 5.80 | Sum of focal distances (f2345) of L2, L3, L4, L5 | 20.58 | |
| 4th lens | f4 | −6.61 | f2345/f | 5.345 | |
| 5th lens | f5 | −28.61 | v2 − v4 | 0 | |

Further, the lens system according to the first embodiment of the present invention is designed such that te/tc is 1.26, R_L1S1/R_L1S2 is 0.49, and R_L2S1−R_L2S2 is −0.045.

Second Embodiment

Figure 2:
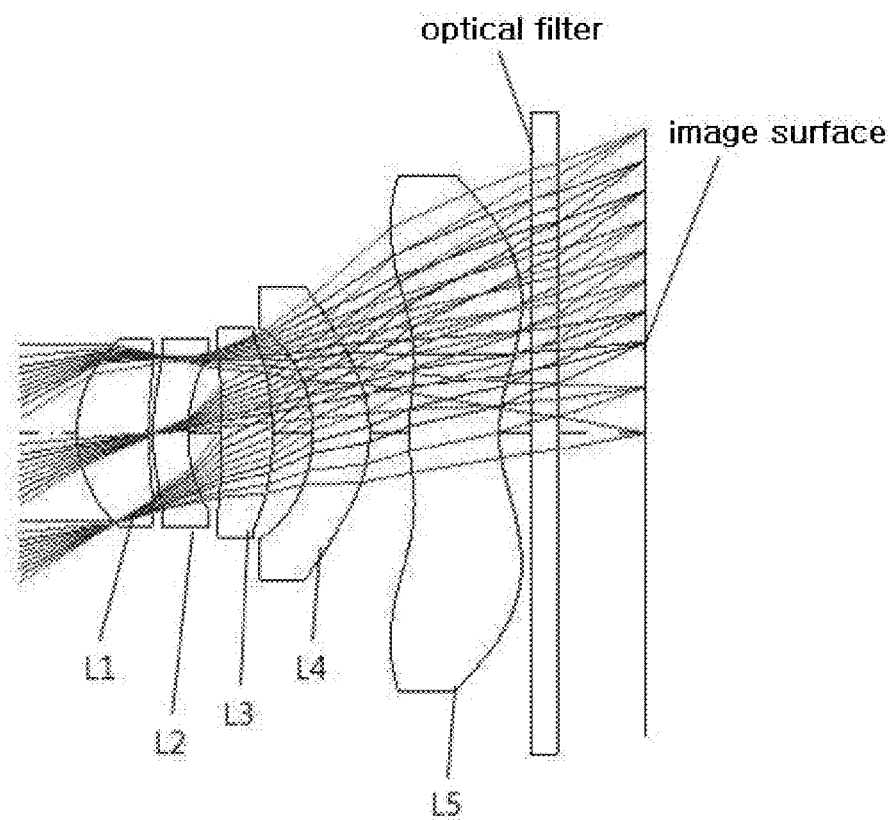
FIG. 2 is a view illustrating a photographic lens system enabling reduction in tightness of manufacturing tolerance according to a second embodiment of the present invention.

FIG. 2 is a view illustrating a photographic lens system enabling reduction in tightness of manufacturing tolerance according to the second embodiment of the present invention.

As shown in FIG. 2, in the second embodiment, a first lens L1, an iris, a second lens L2, a third lens L3, a fourth lens L4, and a fifth lens L5 are sequentially arranged along an optical axis from an object.

Table 4 shows numerical data of the lenses constituting the optical system according to the second embodiment of the present invention.

TABLE 4

| Surface (surface number) | RDY (radius of curvature) | THI (thickness) | Nd (refractivity) | Vd (ABBE number) |
|---|---|---|---|---|
| OBJ | | | | |
| 1 | 1.371019 | 0.56345914 | 1.5441 | 56 |
| 2 | 2.617764 | 0 | | |
| STO | | 0.03769084 | | |
| 3 | 1.962352 | 0.28 | 1.6378 | 23 |
| 4 | 1.858745 | 0.26680411 | | |
| 5 | −12.081744 | 0.39950199 | 1.5441 | 56 |
| 6 | −3.284952 | 0.32286215 | | |
| 7 | −1.443607 | 0.44201585 | 1.6378 | 23 |
| 8 | −1.734914 | 0.31877473 | | |
| 9 | 2.532386 | 0.70889119 | 1.53113 | 56 |
| 10 | 1.533299 | 0.25 | | |
| | | 0.21 | BK7 | |
| | | 0.7 | | |
| IMG | | | | |

(OBJ: object surface, STO: iris, IMG: image surface, Infinity: planar surface)

As shown in FIG. 2, in the lens system according to the second embodiment of the present invention, the first lens L1, the iris (STO), the second lens L2, the third lens L3, the fourth lens L4 and the fifth lens are sequentially arranged from the object. Further, when the direction of the optical axis is set to an X-axis, and the direction crossing perpendicularly the optical axis is set to a Y-axis, the aspheric surface is a curved surface formed by rotating a curved line obtained from the aspheric surface equation that is Equation 1 around the optical axis. In Equation 1, R is a radius of curvature, K is a conic constant, and A, B, C, D, E and F are aspheric surface coefficients.

The aspheric surface coefficients in Equation 1 which have data of the respective lenses are shown in Table 5.

TABLE 5

| K | A | B | C | D | E | F |
|---|---|---|---|---|---|---|
| −0.20276 | 0.0064561 | 0.0304056 | −0.026213 | −0.055339 | 0.1657571 | −0.118333 |
| 0 | −0.419935 | 0.652159 | −0.688158 | 0.4347798 | −0.112453 | −0.109217 |
| 0 | −0.425253 | 0.4970125 | −0.33141 | 0.1980289 | −0.21795 | 0.0115793 |
| 3.4570999 | −0.105826 | −0.027 | 0.0740111 | 0.1641991 | −0.379825 | −0.010837 |
| 0 | −0.017154 | −0.014136 | −0.104829 | 0.3276444 | −0.224325 | 0.181715 |
| 0 | 0.0209259 | −0.114661 | 0.1604777 | −0.245854 | 0.0823464 | 0.1168511 |
| −7.365124 | −0.176619 | 0.0894135 | −0.024101 | −0.122307 | 0.0503797 | −0.00582 |
| 0.1382658 | −0.026388 | 0.08253 | −0.025284 | 0.0034388 | 0.0014379 | −0.000884 |
| −19.9049 | −0.191739 | 0.0905224 | −0.019718 | 0.0021679 | −9.62E−05 | −9.25E−09 |
| −7.115731 | −0.084334 | 0.0253544 | −0.005686 | 0.000684 | −3.55E−05 | 5.84E−07 |

Table 6 shows focal distances of respective lenses, a total focal distance, and values of f2/f1, SL/TTL, f2345/f, and v2−v4.

TABLE 6

| | Focal distance | Total focal distance (f) | f2/f1 | SL/TTL |
|---|---|---|---|---|
| $1^{st}$ lens | f1 | 4.55 | 3.87 | 219.89 | 1.08 |
| $2^{nd}$ lens | f2 | 1000.00 | | | |
| $3^{rd}$ lens | f3 | 8.13 | Sum of focal distances (f2345) of L2, L3, L4, L5 | 965.52 | |
| $4^{th}$ lens | f4 | −32.93 | f2345/f | 249.488 | |
| $5^{th}$ lens | f5 | −9.68 | v2 − v4 | 0 | |

Further, the lens system according to the second embodiment of the present invention is designed such that te/tc is 1.32, R_L1S1/R_L1S2 is 0.5237, and R_L2S1−R_L2S2 is 0.1036.

As described above, the photographic lens system enabling reduction in tightness of manufacturing tolerance according to the embodiments of the present invention is composed of five lenses, in which refractivities of the respective lenses, and the focal distance, the shape, the ABBE number and the radius of curvature of the second lens are defined such that smallness and high resolution of the photographic lens system can be realized.

Particularly, in the photographic lens system of this invention, the second lens is designed such that it has positive refractivity and the focal distance thereof is ten or more times the focal distance of the first lens, thereby realizing smallness and efficient compensation for aberration of the lens, enabling reduction in tightness of manufacturing tolerance of the lens, and increasing possibility of reproducing the performance of lenses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A photographic lens system enabling reduction in tightness of manufacturing tolerance, comprising: a first lens, a second lens, a third lens, a fourth lens and a fifth lens sequentially arranged along an optical axis from an object, wherein
the first lens has strong positive refractivity, the second lens is a meniscus type lens and has weak positive refractivity, the third lens has upward convex-shaped positive refractivity, the fourth lens has upward convex-shaped negative refractivity, and the fifth lens has negative refractivity; and
the lens system satisfies a relation, f2/f1>10, wherein f1 is a focal distance of the first lens, and f2 is a focal distance of the second lens.

2. The photographic lens system enabling reduction in tightness of manufacturing tolerance as set forth in claim 1, satisfying a relation, |v2−v4|<5, wherein v2 is an ABBE number of the second lens, and v4 is an ABBE number of the fourth lens.

3. The photographic lens system enabling reduction in tightness of manufacturing tolerance as set forth in claim 1, satisfying a relation, te/tc<1.35, wherein to is a lens thickness on an effective diameter of a rear surface of the second lens, and tc is a center thickness of the second lens.

4. The photographic lens system enabling reduction in tightness of manufacturing tolerance as set forth in claim 1, further comprising:
an iris arranged between the first lens and the second lens.

5. The photographic lens system enabling reduction in tightness of manufacturing tolerance as set forth in claim 1, satisfying a relation, R_L1S1/R_L1S2<0.6, wherein R_L1S1 is a radius of curvature of a front surface of the first lens, and R_L1S2 is a radius of curvature of a rear surface of the first lens.

6. The photographic lens system enabling reduction in tightness of manufacturing tolerance as set forth in claim 1, satisfying a relation, |R_L2S1−R_L2S2|<0.15, wherein R_L2S1 is a radius of curvature of a front surface of the second lens, and R_L2S2 is a radius of curvature of a rear surface of the second lens.

7. The photographic lens system enabling reduction in tightness of manufacturing tolerance as set forth in claim 1, satisfying a relation, f2345/f>4, wherein f is a total focal distance of all the lenses, and f2345 is a sum of focal distances of the second lens, the third lens, the fourth lens and the fifth lens.

8. The photographic lens system enabling reduction in tightness of manufacturing tolerance as set forth in claim 1, wherein the first lens has an aspheric surface on at least one surface, the second lens has aspheric surfaces on opposite surfaces, the third lens has an aspheric surface on at least one surface, the fourth lens has aspheric surfaces on opposite surfaces, and the fifth lens has aspheric surfaces on opposite surfaces, with a plurality of inflection points defined on the aspheric surfaces of the fifth lens.

9. The photographic lens system enabling reduction in tightness of manufacturing tolerance as set forth in claim 1 or 2, wherein a material of any one of the first lens, the second lens, the third lens, the fourth lens and the fifth lens is different from a material of remaining lenses.

10. A photographic lens system enabling reduction in tightness of manufacturing tolerance, comprising a first lens, an iris, a second lens, a third lens, a fourth lens and a fifth lens sequentially arranged along an optical axis from an object, wherein
the first lens has strong positive refractivity, the second lens is a meniscus type lens and has weak positive refractivity, the third lens has upward convex-shaped positive refractivity, the fourth lens has upward convex-shaped negative refractivity, and the fifth lens has negative refractivity, and
the lens system satisfies relations, f2/f1>10, and |v2−v4|<5, wherein the fifth lens is an aspheric lens, f1 is a focal distance of the first lens, f2 is a focal distance of the second lens, v2 is an ABBE number of the second lens, and v4 is an ABBE number of the fourth lens.

11. The photographic lens system enabling reduction in tightness of manufacturing tolerance as set forth in claim 10, satisfying a relation, te/tc<1.35, wherein to is a lens thickness on an effective diameter of a rear surface of the second lens, and tc is a center thickness of the second lens.

12. The photographic lens system enabling reduction in tightness of manufacturing tolerance as set forth in claim 10, satisfying a relation, R_L1S1/R_L1S2<0.6, wherein R_L1S1 is a radius of curvature of a front surface of the first lens, and R_L1S2 is a radius of curvature of a rear surface of the first lens.

13. The photographic lens system enabling reduction in tightness of manufacturing tolerance as set forth in claim 10, satisfying a relation, |R_L2S1−R_L2S2|<0.15, wherein R_L2S1 is a radius of curvature of a front surface of the second lens, and R_L2S2 is a radius of curvature of a rear surface of the second lens.

14. The photographic lens system enabling reduction in tightness of manufacturing tolerance as set forth in claim 10, satisfying a relation, f2345/f>4, wherein f is a total focal distance of all the lenses, and f2345 is a sum of focal distances of the second lens, the third lens, the fourth lens and the fifth lens.

15. The photographic lens system enabling reduction in tightness of manufacturing tolerance as set forth in claim 10, wherein the first lens has an aspheric surface on at least one surface, the second lens has aspheric surfaces on opposite surfaces, the third lens has an aspheric surface on at least one surface, the fourth lens has aspheric surfaces on opposite surfaces, and the fifth lens has aspheric surfaces on opposite surfaces, with a plurality of inflection points defined on the aspheric surfaces of the fifth lens.

16. The photographic lens system enabling reduction in tightness of manufacturing tolerance as set forth in claim 10, wherein a material of any one of the first lens, the second lens, the third lens, the fourth lens and the fifth lens is different from a material of remaining lenses.

* * * * *